Figures 1, 2:
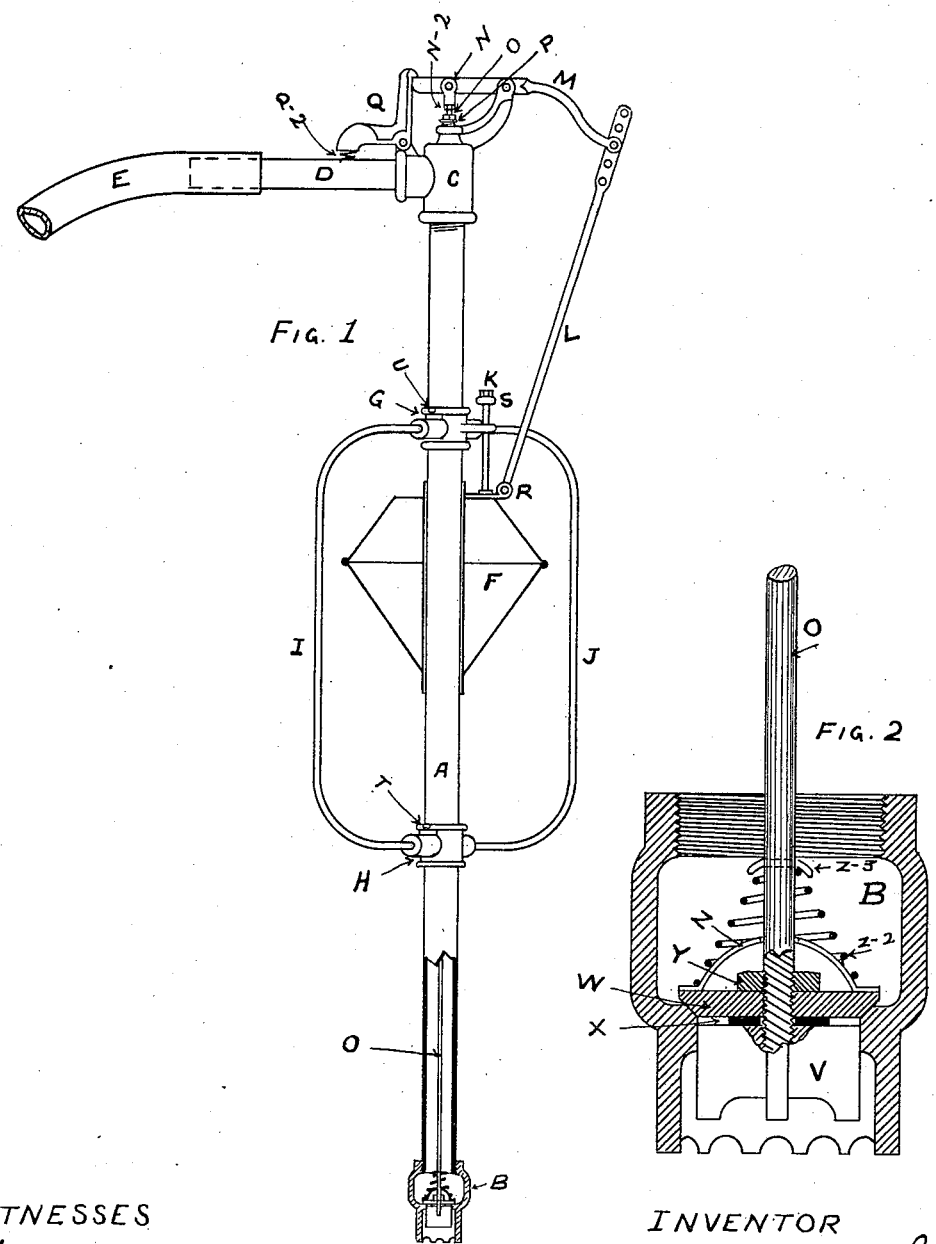

(No Model.)

E. C. SAULS.
CAN FILLER.

No. 407,252. Patented July 16, 1889.

WITNESSES
William Cook
Chas. G. Sauls

INVENTOR
Edward Clarence Sauls

N. PETERS, Photo-Lithographer, Washington, D. C.

UNITED STATES PATENT OFFICE.

EDWARD CLARENCE SAULS, OF COLUMBUS, GEORGIA.

CAN-FILLER.

SPECIFICATION forming part of Letters Patent No. 407,252, dated July 16, 1889.

Application filed October 20, 1888. Serial No. 288,693. (No model.)

*To all whom it may concern:*

Be it known that I, EDWARD CLARENCE SAULS, a citizen of the United States, residing at Columbus, county of Muscogee, State of Georgia, have invented a new and useful Apparatus for Automatically Filling the Cans Holding the Water to be Frozen which are Used in a Machine for the Manufacture of Artificial Ice, and when taken in connection with the accompanying drawings is a full, clear, and accurate description of the same, which will enable others skilled in the art to produce the same.

Can-fillers as ordinarily constructed consist of a pipe connected by a hose to a tank containing the water used for filling the cans. The pipe referred to has at its lower end a valve, the stem of which projects below the bottom of the valve, and when inserted in a can the projecting stem strikes the bottom and opens the valve and admits water. When the can has been filled to the proper height, the pipe is withdrawn, the pressure of water above the valve causing it to close automatically and shut off the water. This apparatus has its objections, the principal of which is that it has to be continually watched while the can is being filled in order to prevent its running over, and also the loss of time which could be devoted to some other necessary work if the apparatus did not require undivided attention while in operation.

Referring to the accompanying drawings, Figure 1 represents a side view of the complete apparatus; Fig. 2, a sectional view of the valve on the lower end of the same, which controls the admission of the water to the can or other receptacle to be filled.

The apparatus is connected to the tank containing the water for filling the can by a hose E and nipple D.

C is a T; F, float; G, upper collar holding guide-rods; I J, guide-rods; K, stop; L, connecting-rod; M, valve-lever; N, valve-stem fork; $N^2$, lock-nut; O, valve-stem; P, gland; Q, latch; $Q^2$, spring; R, lug; S, rubber cushion; T U, set-screws; V, valve-guides; W, leather disk of valve; X, metallic washer; Y, nut; Z, support for leather disk of valve; $Z^2$, spring; $Z^3$, pin. The pipe which has at its lower end the valve B is filled with water, as is also the T C, nipple D, and hose E.

When it is desired to fill a can, the apparatus is inserted in it, the serrated edge of the valve B resting on the bottom and the guides I and J reaching to the two corners of the can and steadying the apparatus and keeping it in a vertical position. As soon as the valve touches the bottom of the can the latch Q is pressed just above the spring $Q^2$. This movement pulls the hook off the end of the valve-lever M, which results in the valve-stem O being raised, and with it the valve-disk W from its seat, the float F being sufficiently heavy to do this through the medium of the connecting-rod L, the stop K preventing the float from falling any farther than necessary and not opening the valve too far. As soon as the catch Q is released the float drops quickly, and to prevent any sudden jar or shock to the apparatus a rubber cushion S is inserted between the two surfaces, which absorbs the momentum and does not produce any objectionable shock. The valve-disk W being raised from its seat, the water runs out into the can until it reaches the float F, which causes it to rise, and at the same time closes the valve and shuts off the water. At the same time the latch Q hooks over the top of the valve-lever M and holds the valve closed. The spring $Z^2$, which presses against the support of the leather disk Z, admits of a small amount of vertical movement in the disk and compensates for any variation between the valve-stem O and the pipe B.

What I claim as new, and desire to secure by Letters Patent, is—

1. In a can-filler, the combination, with the main pipe, the valve in the lower end thereof, and its valve-stem, of the vertically-sliding float on the main pipe, a suitably-fulcrumed valve-lever pivoted to the upper end of the valve-stem, a latch arranged to engage one end of this lever, the connecting-rod between its other end and the float, and the guides for the pipe adapted to enter opposite corners of the can, and thus support said pipe in an upright position, all substantially as described.

2. In combination with the main pipe of a can-filler, the guide-rods I J and their upper and lower collars G H, which collars are movable on said main pipe, substantially as described.

3. The combination of the main pipe, its valve and valve-stem, the vertically-sliding float on the main pipe, the guides for the pipe adapted to enter opposite corners of the can, and thus support said pipe in an upright position, the stop on the float connected to these guides, the lever pivoted to the upper end of the valve-rod, the latch engaging the same, and the rod connecting the lever with the float, substantially as described.

4. In combination with the main pipe of a can-filler, the hose for supplying it, the valve and valve-stem in the main pipe, the sliding float on the main pipe, the valve-lever pivoted to the valve-stem, the spring-latch engaging the valve-lever, the connecting-rod between the valve-lever and the float, and the guide-rods connected adjustably to the main pipe and adapted to enter corners of the can to support the same in an upright position, substantially as and for the purpose described.

5. The combination of the valve and the valve-stem, having at its lower end a spring holding valve in position and allowing for unequal expansion without opening the valve, substantially as described.

EDWARD CLARENCE SAULS.

Witnesses:
WILLIAM COOK,
CHAS. G. SAULS.